INVENTOR:
RENE JOSEPH BOCOGNANO

United States Patent Office 2,969,111
Patented Jan. 24, 1961

2,969,111

PROCESS AND APPARATUS FOR SPRAYING AND DEHYDRATING SUSPENSIONS IN VACUO

René Joseph Bocognano, 3 Rue Carpeaux, Paris, France

Filed Apr. 25, 1956, Ser. No. 580,527

Claims priority, application France Apr. 26, 1955

6 Claims. (Cl. 159—3)

The present invention relates to methods and apparatus for dehydrating aqueous fluids including both solutions and suspensions of solids, the dehydration being performed under conditions of sub-atmospheric pressure accompanied by the application of heat and vibration.

An object of the invention is to obtain, with a process of this kind, a separation or dispersion of the solid particles so as to facilitate the evaporation of the liquid.

Another aim of the invention is to provide an apparatus for conveniently and cheaply operating the process.

Other aims and advantages of the invention will be revealed by the description which follows.

Embodiments of the invention are shown by way of example in the attached drawings, in which.

According to a first form of embodiment of the process according to the invention, a vibratory agitation is applied to the particles of the product so that these particles are subjected to oscillations which separate them from each other, either in the form of steam, or else the surface of the liquid suspension is split up into a great number of droplets exceeding the normal number, which produces a high rate of evaporation of the suspension of particles to be dehydrated.

The vibratory phenomena applied to the suspension of particles in a liquid or pasty state are combined with producing a vacuum in the container or chamber in which the dehydration itself takes place.

Figure 3:
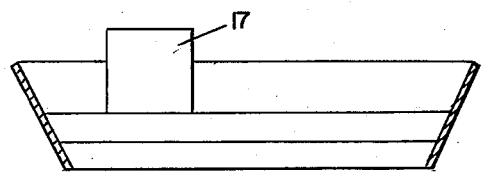
Figure 3 is a side elevational view of a single dehydrating plate in accordance with a modified form of the invention wherein each plate is individually provided with a plurality of ultrasonic vibration generators.
Figure 4:
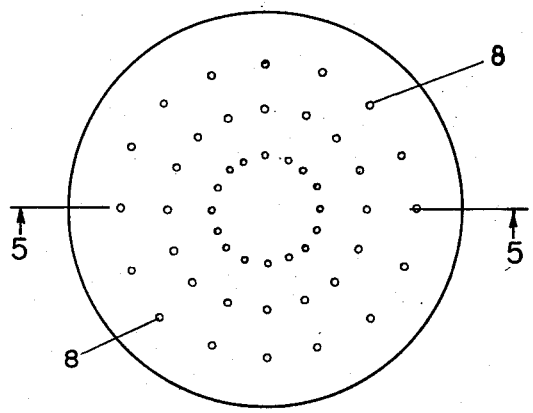
Figure 4 is a plan view of one of the foraminous plates partly in section taken along the line IV—IV of Fig. 1.
Figure 5:
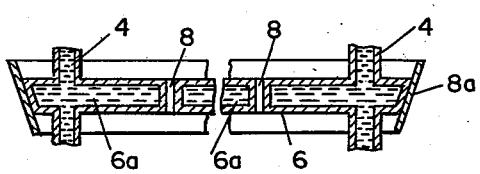
Figure 5 is a sectional view in side elevation taken along the line V—V of Fig. 4 showing one of the foraminous plates with its internal passages for the circulation of hot water for heating the plate.

According to one form of embodiment of the preceding process, the vibratory period and the amplitude of the vibratory phenomenon to which the product in suspension is submitted is changed during the operation, as shown in Fig. 3, which determines an agitation of the particles and even sections of the product spreading out vertically and havng their origin right in the midst of the material dealt with.

The hollows created by the agitation of the particles have the result of putting the liquid suspension into a state of ebullition or steam, in combination with creating a vacuum in the container in which the dehydration itself takes place.

According to an alternative of the preceding processes, the vibratory phenomena to which the product—or rather, the particles of the product—to be dehydrated are submitted, are assured by ultrasonic phenomena.

Figure 1:
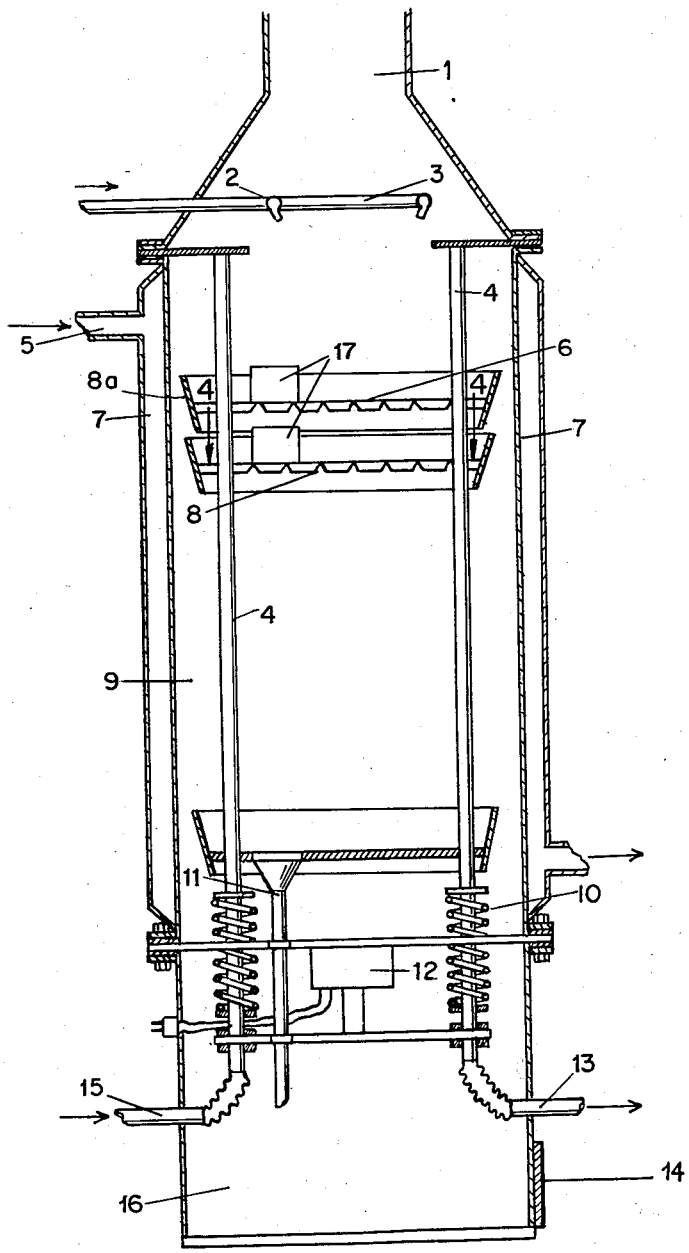
Figure 1 is an axial vertical section of a dehydrating apparatus according to the invention.
Figure 2:
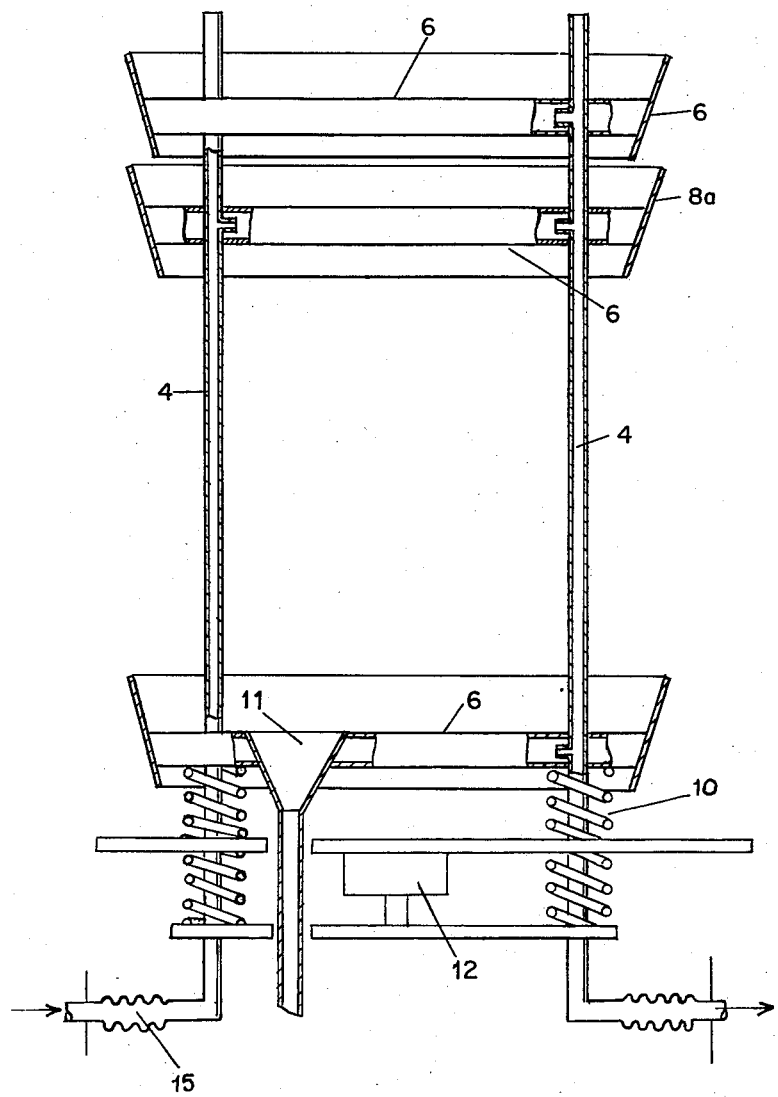
Figure 2 is an enlarged fragmentary sectional view showing foraminous heated plates, a vibrator and interconnecting springs acting as a resonator.

The dehydrating apparatus shown in Figures 1 and 2 comprises the following essential elements:

(a) Container emptied of air in communication with a vacuum pump;

(b) Hollow columns for the circulation of hot water feeding each plate;

(c) An electro-magnetic vibrator putting the column-plate assembly into vibration.

The container consists of a cylinder 9, closed at the bottom, communicating at its top with a suction duct 1 which extends to a vacuum pump (not shown), defining a closed chamber for producing a vacuum, columns 4 assuring the circulation of hot water to the foraminous plates 6 drilled with holes 8.

Each column 4 communicates with supply means (not shown) outside the cylinder for ensuring the input and output of hot water.

Each plate 6 is provided with water circulation passages 6a which communicate with the columns or risers 4 so that there is a circulation of hot water for heating each plate.

A vibrator 12 communicates its frequency to the plate assembly, being connected thereto through the intermediary of springs 10.

The springs are tuned and act on the plate assembly by resonance.

The product to be dehydrated passes through the foraminous plates 6 via their apertures 8 and reaches the funnel 11 communicating with the lowermost plate by gravity and falls into the bottom part of the container 16. Each plate 8 is provided with an upwardly projecting circumferential rim 8a extending therearound for retaining liqud on the plate. If the solid particles are already dried they are retained on the plate by the rim 8a in the same manner as liquid.

A tight-fitting door 14 is provided at the bottom of the vacuum chamber for withdrawal of the solid particles in a dehydrated condition.

The apparatus described above by way of example (Figure 1) operates in the following manner: the liquid suspension of solid particle supplied by the pipe 3 enters the vacuum chamber through the spray cones 2, is atomized in container 9, falls on the uppermost of the vertically spaced foraminous plates 8, is subjected to heat and vibration, and passes through successive ones of the foraminous plates while losing its moisture and arrives dehydrated in the bottom part of the vacuum chamber at 16.

It will be observed that because of the vacuum prevailing in the closed chamber 9, it will not be necessary to heat the material being dehydrated to an elevated temperature. For example, reference to a steam table shows that saturated steam has a temperature of 70° F. or 21.1° C. when the pressure is reduced to a sub-atmospheric pressure of 0.38 pound per square inch absolute or 18.75 millimeters of mercury. Thus, dehydration may proceed at temperatures of the order of room temperature (70° F.) by providing a sufficient degree of vacuum. As a result, fruit juices and similar vitamin bearing substances may be concentrated by dehydration in the apparatus shown and described without destroying delicate components which become decomposed or otherwise damaged when subjected to temperatures of the order of 100° F. or higher.

Various modifications can be applied to the apparatus described above by way of example. More particularly, a plurality of ultrasonic generators may be placed on the plates as shown in Figs. 1 and 3, the ultrasonic vibration generators being indicated by the reference numeral 17.

A heater 7 with steam circulation is provided in the vacuum chamber defined by the container 9, which, by its presence, maintains the temperature required for the evaporator.

What I claim is:

1. The method of dehydrating solid particles suspended in a liquid which comprises the steps of producing a vacuum zone of sub-atmospheric pressure, spraying said liquid into said zone to atomize the same at said sub-atmospheric pressure, passing said atomized suspension downwardly through said zone by gravity through a limited distance, repeatedly supporting said suspension at spaced intervals during the course of its downward movement to arrest said movement, repeatedly subjecting said suspension to heat and vibration while its movement is thus arrested, and recovering the dehydrated solid material at the lower limit of said downward movement.

2. The method according to claim 1, wherein the frequency of said vibration is ultrasonic.

3. Dehydrating apparatus of the class described, comprising: means defining a closed vacuum chamber connected to a suction duct; a series of vertically spaced superposed foraminous plates disposed in said chamber; each plate including means for retaining liquid thereon; vibratory means connected to said plates for vibrating the same; means for heating said plates; a supply duct connected to deliver a supply of solid particles suspended in a liquid; atomizing means disposed in said chamber above said plates for delivering a spray to the uppermost one of said plates, said atomizing means being connected to said supply duct; and means at the bottom of said chamber for withdrawing said solid particles in a dehydrated condition.

4. Dehydrating apparatus according to claim 3, in which said plates are flat, said liquid retaining means comprising an upwardly projecting circumferential rim extending around each plate.

5. Dehydrating apparatus according to claim 3, further comprising spring means through which said vibratory means is connected to said plates, said spring means being tuned to resonance at the frequency of vibration of said vibratory means.

6. Dehydrating apparatus according to claim 3, wherein said vibratory means comprises ultrasonic vibration generating means supported by each plate.

References Cited in the file of this patent
UNITED STATES PATENTS

| | | |
|---|---|---|
| 1,271,914 | Krafft | July 9, 1918 |
| 1,611,098 | Borner | Dec. 14, 1926 |
| 2,344,754 | Vang | Mar. 21, 1944 |
| 2,439,384 | Fetzer | Apr. 13, 1948 |
| 2,576,297 | Horsley et al. | Nov. 27, 1951 |
| 2,636,555 | Klepetko et al. | Apr. 28, 1953 |
| 2,688,807 | Ginther | Sept. 14, 1954 |
| 2,740,202 | Fowle | Apr. 3, 1956 |
| 2,759,274 | Jonsson | Aug. 21, 1956 |